United States Patent [19]
Addison

[11] Patent Number: 6,035,801
[45] Date of Patent: Mar. 14, 2000

[54] SPIN GROOVE

[76] Inventor: Corran Addison, 100, Ave. de la Marquise, Beauport Quebec, Canada, G1E 1S7

[21] Appl. No.: 09/332,414

[22] Filed: Jun. 14, 1999

Related U.S. Application Data

[63] Continuation-in-part of application No. 09/193,867, Nov. 18, 1998, abandoned.
[51] Int. Cl.$^7$ ...................................................... B63B 35/00
[52] U.S. Cl. ............................................................. 114/347
[58] Field of Search ..................................... 114/347, 61.3, 114/56.1, 61.31, 63, 62, 61.32; D12/302

[56] References Cited

U.S. PATENT DOCUMENTS

D. 322,774  12/1991  Arcouette ................................. D12/302
4,660,490   4/1987   Broadhurst ................................ 114/347

*Primary Examiner*—Ed Swinehart
*Attorney, Agent, or Firm*—Guy J. Houle; Swabey Ogilvy Renault

[57] ABSTRACT

A kayak is disclosed and having a hull section and a deck section. The hull section has a bottom surface circumscribed a contour edge. At least an endless groove is formed in the bottom surface and spaced inwardly of the contour edge, whereby the endless groove traps water and provides a thrust bearing-like action enhancing translational stability during planing conditions and performance in a flat spin of the kayak.

16 Claims, 3 Drawing Sheets

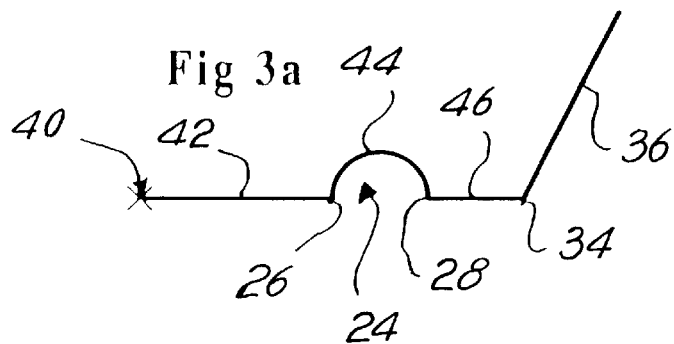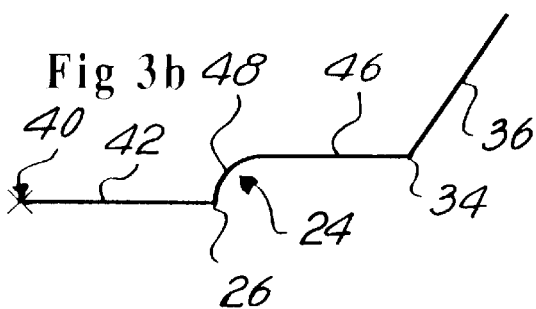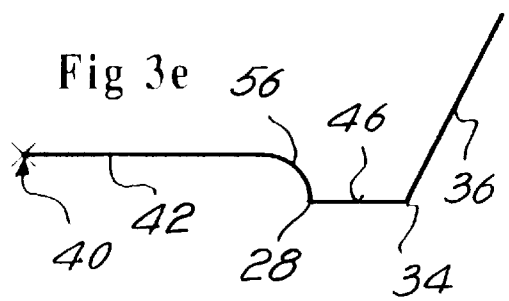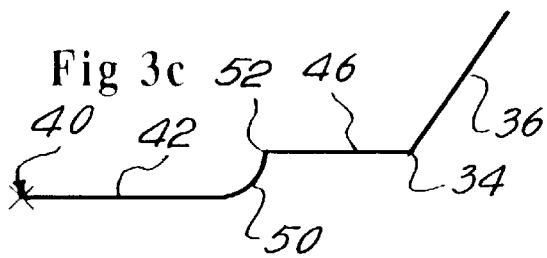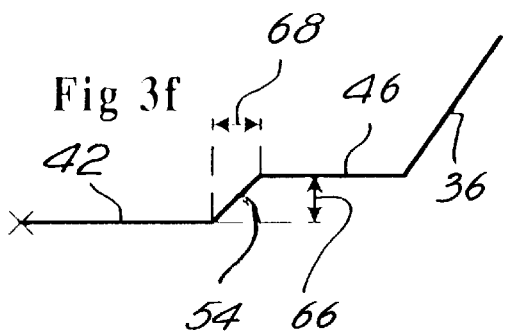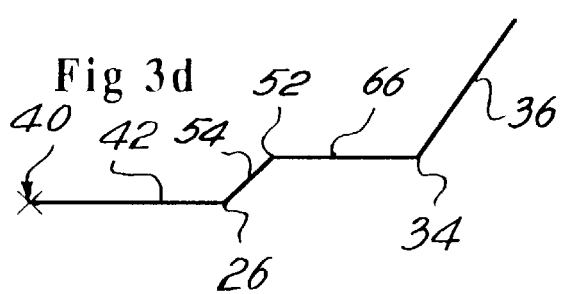

SPIN GROOVE

CROSS-REFERENCE TO RELATED APPLICATION

This application is a continuation-in-part of application Ser. No. 09/193,867, filed Nov. 18, 1998 and now abandoned.

TECHNICAL FIELD

The present invention relates to a water craft and in particular to a kayak hull with improved characteristics.

BACKGROUND ART

Many equipment and technical advances have been made since the early 1980's in the field of whitewater recreational sports. At the same time the average kayak paddler is attempting more challenging rivers and tries to execute more technical whitewater acrobatic maneuvers, than ever before. The average paddler may still lack many of the basic kayak handling skills that allow for greater control of a kayak. The present invention in particular focuses on providing kayak features which improve its performance in regards to a particular technique known as the flat spin.

In general, flat spins are performed by stroking the water with a paddle, with a circular motion which results in the kayak spinning on the surface of the water. Several factors influence this technique. One such factor being the length of the hull at the waterline.

The shorter the waterline of the hull, the easier the spin. Therefore, according to common knowledge, improved handling in a flat spin can be achieved either by shortening the overall length of the hull or by adding a rocker to the hull. A kayak hull with a rocker is one which has upswept ends. This effectively shortens the waterline without shortening the length of the hull itself. There are disadvantages in both cases. The most common being, a significant reduction in speed and increased draft, because the craft sits lower in the water with the chines thus being presented to rocks and water currents.

At certain speeds, which vary from one hull to another, a kayak will begin to plane. Planing is a condition in which the motion of the hull is more influenced by surface effect between the outer skin and the surface of the water than by the fluid flow characteristics to displacement conditions. Planing hulls can plane at much lower speeds. Given that kayaks are man powered, a kayak with a planing hull design is desirable in executing flat spin maneuvers.

At planing conditions the hull rises out of the water, therefore reducing the risk of presenting the sideboard to oncoming rocks and water currents while effectively reducing the length of the hull at the waterline and thus allowing the hull to spin better.

However, planing hulls also tend to 'wander about' when planing. This is due to the fact that at planing conditions there is only a very small portion of the hull in the water thereby reducing translational stability or, in terms encountered in the art, there is very little "hull in the water" to provide a "bite" to keep the craft on course.

At low speeds, when the hull is barely planing, the craft tends to be unpredictable. This is due to fluctuations in power output generated by inconstant speeds and river current surges. An inconstant speed leads to the oscillating motion of the kayak alternating dramatically between planing and displacement conditions. The handling of the craft under these conditions in a flat spin maneuver is rough and unpredictable.

It is known in the art, to provide surfing canoes and whitewater kayaks with features that enhance their translational stability under planing conditions. These designs incorporate longitudinal grooves and bevels into the hull that run parallel with the longitudinal axis of the kayak from bow to stern or a portion thereof. These features sustain translational stability, solving some of the problems mentioned above, but because of the longitudinal disposition of these features which restrict the direction of travel of the water according to the disposition of these grooves, the craft's ability to spin is inhibited.

SUMMARY OF INVENTION

It is an aim of the present invention to provide a whitewater kayak or with greater control in executing flat spin maneuvers. The invention both creates and sustains planing conditions for both planing and displacement hulls, and allows the paddler to better control the craft with more precision compared to other surf canoes or whitewater kayaks that do not have this feature. In particular the features introduced by the present invention enhance handling performance in a flat spin maneuver.

It is an aim of the present invention to provide a whitewater kayak with water trapping elements on the bottom surface of its hull which perform an action close to that of a thrust bearing.

It is another aim of the present invention to provide a whitewater kayak with water trapping elements on the bottom surface of its hull which enhance the craft stability.

According to the above features of the present invention there is provided, a kayak having a hull section and a deck section. The hull section has a bottom surface circumscribed by a countour edge. At least an endless groove is formed in the bottom surface and spaced inwardly of the countour edge, whereby the endless groove traps water and provides a thrust bearing-like action enhancing translational stability during planing conditions and performance in a flat spin of the kayak.

BRIEF DESCRIPTION OF THE DRAWINGS

The present invention will be better understood by way of the following detailed description of a preferred embodiment as shown in the appended drawings in which:

FIGS. 3 is a series of details of profiles of spin groove designs;

DESCRIPTION OF PREFERRED EMBODIMENTS

Figure 1A:
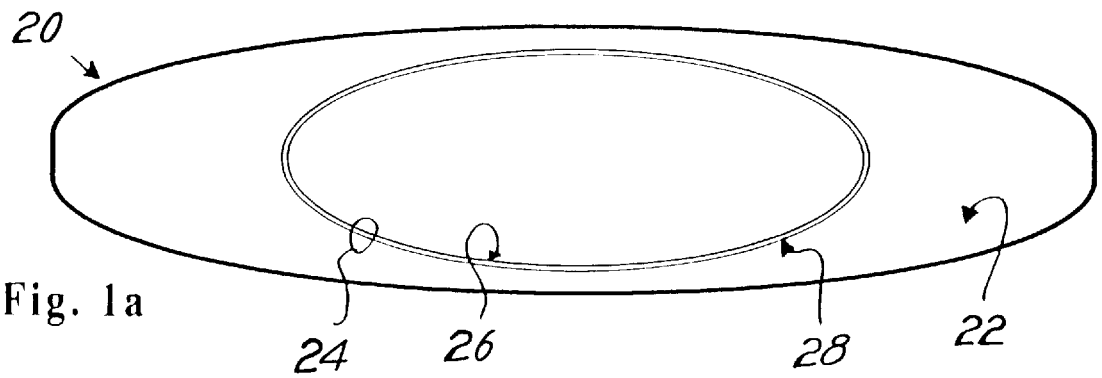
FIG. 1a is a bottom view of a hull of a whitewater kayak with a spin groove oval in shape.

According to a preferred embodiment of the present invention, as shown in FIG. 1a, a kayak 20 with a hull 22 has a spin groove 24 of an oblong shape. The spin groove 24 has a semicircular cross-section, shown in FIG. 2, defining two convex abrupt changes 26 and 28 in the surface of the hull 22. The essential elements being the abrupt changes 26 and 28 in the surface of the hull 22 disposed in a closed pattern running spaced away inwardly from the perimeter of the wetted area.

Figure 1B:
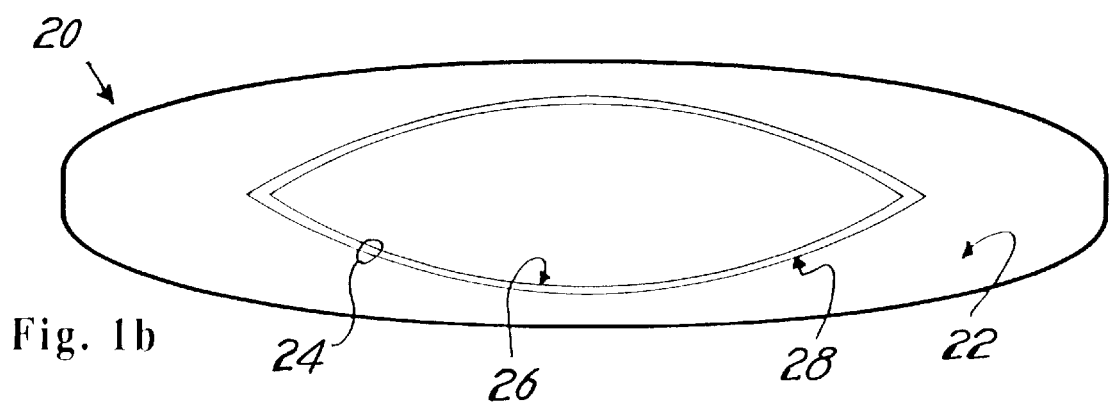
FIG. 1b is a bottom view of a hull of a whitewater kayak with a spin groove pointy in shape.
Figure 1C:
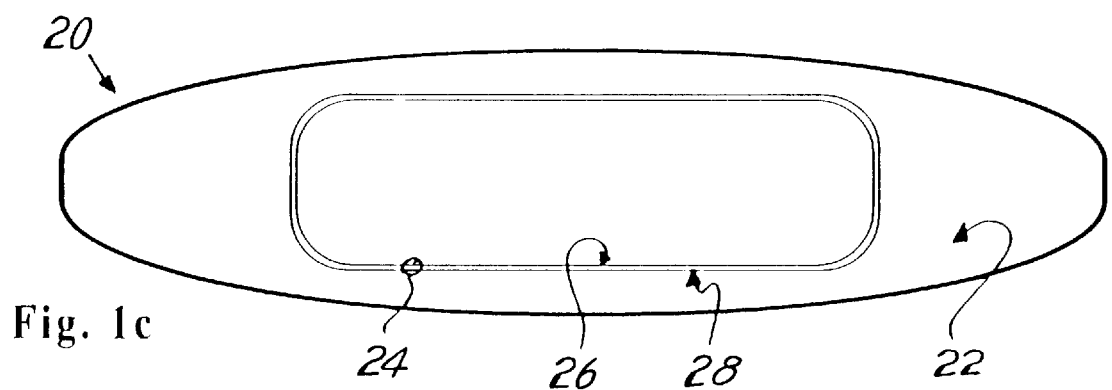
FIG. 1c is a bottom view of a hull of a whitewater kayak with a spin groove generally rectangular in shape.

FIGS. 1*b* and 1*c* show alternative embodiments of the present invention in which the spin groove 24 has a pointy or generally rectangular shape, respectively.

Figure 2:
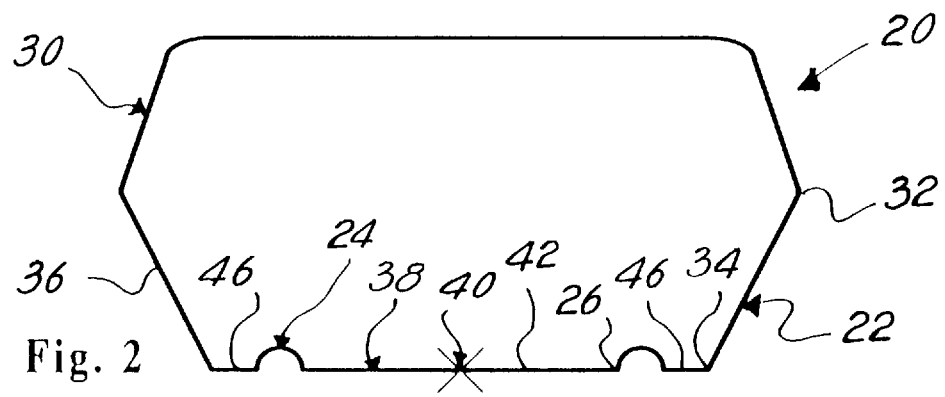
FIG. 2 is a cross-sectional view of a whitewater kayak emphasizing the spin groove in the hull.

FIG. 2 shows a transverse cross-section of a kayak 20 about its center. The hull 22 and a deck 30 are separated by a seam line 32. The hull 22 has chines 34 separating a sideboards 36 of the hull from a bottom 38 of the hull. The spin groove 24 runs on the bottom 38 of the hull 22 spaced away inwardly from the chines 34. The spin groove 24 forms two convex abrupt changes 26 and 28 with the surface of the hull 22. The spin groove 24 also divides the bottom of the hull 38 into a first bottom surface 42 of the hull enclosed by the spin groove 24 and a second bottom surface 46 of the hull circumscribing the first bottom surface 42. A cross marks a center 40 of the bottom 38 of the hull 22.

FIG. 3*a* shows in detail the profile of the spin groove 24 according to the preferred embodiment in which the first bottom surface 42 of the hull 22 is bordered by the inner abrupt convex edge 26 of the hull 22. The inner abrupt convex edge 26 is also the inner edge of the spin groove 24 which, according to the preferred embodiment, is a semicircular channel 44. The outer abrupt convex edge 28 of the hull 22 is the outer edge of the spin groove 24. The outer abrupt convex edge 28 borders the second bottom surface 46 of the hull which extends to the chines 34.

Alternatively, in other embodiments of the present invention, the spin groove 24 can have other profiles some of which are described with the features pointed out in sequence from the center 40 of the hull towards the chine 34.

FIG. 3*b* shows the first bottom surface 42 of the hull bordered by an abrupt convex edge 26 formed by a pointy concave bevel 48 leading smoothly into the second bottom surface 46 of the hull. The second bottom surface 46 is disposed superiorly relative to the first bottom surface 42 and extends to the chines 34.

FIG. 3*c* shows the first bottom surface 42 of the hull bordered, with a smooth transition, by a pointy convex bevel 50 which makes an abrupt concave edge 52 in the surface of the hull 22 as it meets with the second bottom surface 46. The second bottom surface 46 is disposed superiorly relative to the first bottom surface 42 and extends to the chines 34.

FIG. 3*d* shows the first bottom surface 42 bordered by the abrupt convex edge 26 leading into a slanted bevel 54. The slanted bevel 54 terminates in the abrupt concave edge 52 made with the second bottom surface 46. The second bottom surface 46 is disposed superiorly relative to the first bottom surface 42 and extends to the chines 34.

FIG. 3*e* shows the first bottom surface 42 leading with a smooth transition into a pointy concave bevel 56. The concave bevel 56 terminates with the abrupt convex edge 28 formed with the second bottom surface 46 of the hull. The second bottom surface 46 is disposed inferiorly relatively to the first bottom surface 42 and extends to the chines 34.

Considering the alternate embodiments of the present invention, the first bottom surface 42 of the hull can be substantially flat, smoothly convex (not shown), or smoothly concave (not shown). Alternatively the second bottom surface of the hull can be substantially flat, as shown at 46, smoothly convex (not shown) or smoothly concave (not shown), and in general parallel, as shown in the FIG. 3 series, or slanted with respect to the first bottom surface 42 (not shown).

Yet other embodiments of the present invention can have the second bottom surface 46 of the hull connected to the sideboards 36 at the chines 34 forming another abrupt convex edge, as shown in FIGS. 2 and 3, or a smooth edge (not shown).

The crux of the invention is the presence of a water trapping abrupt edge on the bottom surface of the hull of the kayak. Water trapping is accomplished by the closed groove on the bottom surface of the kayak's hull. The functionality of the invention comes from fact that water is trapped on the bottom surface of the hull providing a bearing action similar to that of a thrust bearing. This gives the kayak superior performance in a flat spin.

The present invention effectively solves many of the problems encountered in the prior art by the introduction of the spin groove 24, with an overall shape, as shown in FIG. 1, and cross-sectional profile, as shown in FIG. 3, located inside of the chines 34 of the kayak 20. Providing the spin groove 24 on a hull 22 effectively accomplishes the following:

a small amount of water is pulled into the spin groove 24 that runs in a closed pattern (the actual size and shape of the groove varies according to the exact amount of lift, spin and/or traction required) on the hull 22, planing is maintained at slow speeds by keeping a small raised ring of water under the boat at all times, and therefore this leads to translational stability and a reduction in the unpredictability associated with the hull oscillating motion alternating dramatically between planing and displacement conditions, maintains all the lift and reduced wetted area of the longitudinal grooves currently used on surf kayaks, yet because of its closed shape, allows and aids the boat to spin on the raised closed track of water in the spin groove, and prohibits the boat from 'wandering' during a flat spin because the raised portion of the water in the groove is higher than the rest of the hull, thereby stopping the boat from sliding about uncontrollably.

Figure 4:
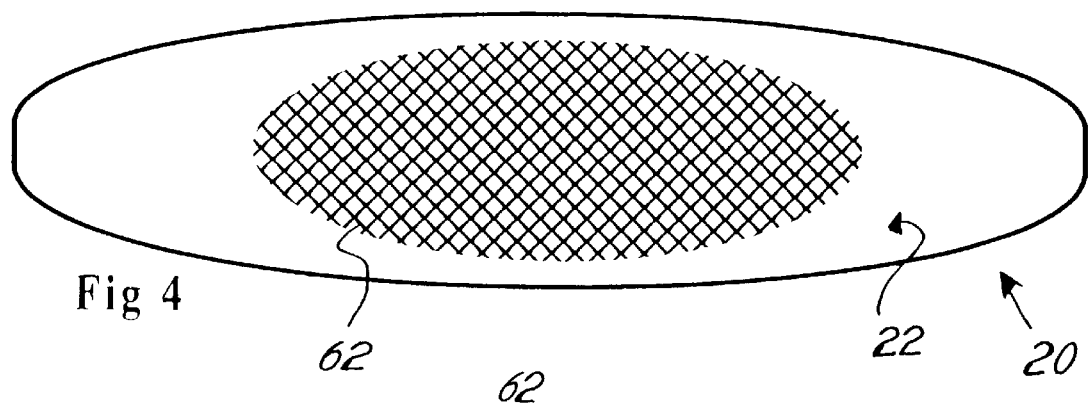
FIG. 4 is a bottom view of a hull of a whitewater kayak with a cross groove.
Figure 5A:
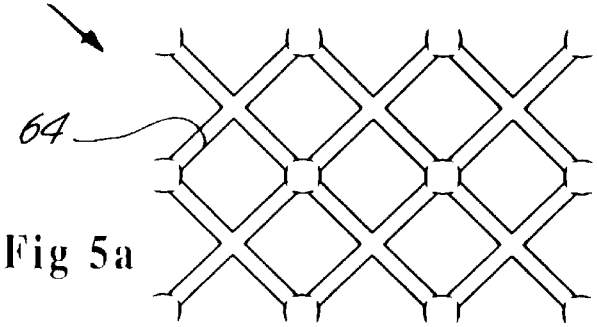
FIG. 5a is a detail of a design of a cross-groove.
Figure 5B:
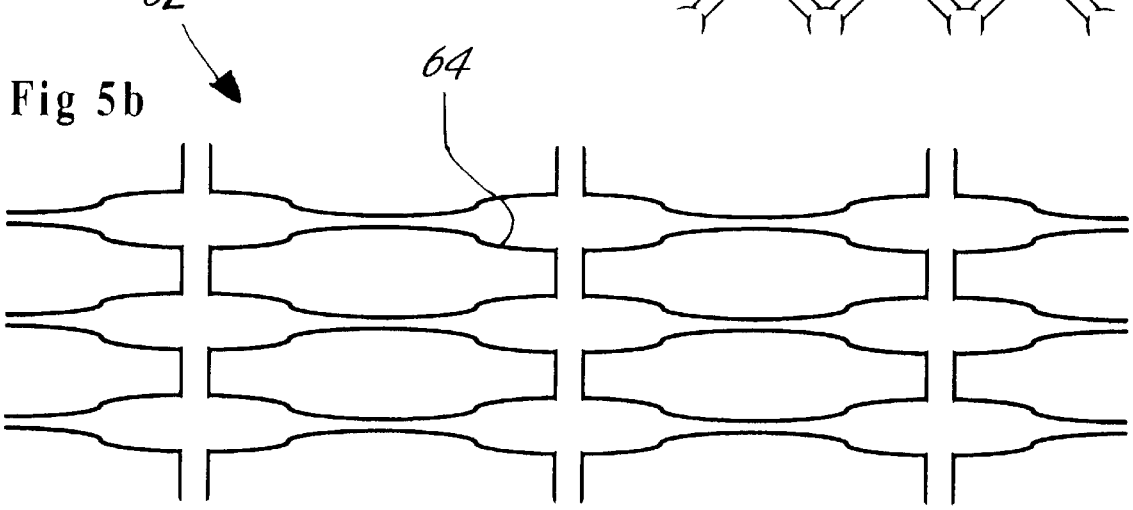
FIG. 5b is another detail of a design of a cross-groove.

According to another embodiment of the present invention, shown in FIG. 4, a kayak 20 hull 22, is provided with a plurality of spin grooves disposed in a pattern 62 referred to in the art as a "cross-groove". The cross groove 62 comprises of individual pattern cells 64. The crossgroove 62 can: have any density, be disposed at any angle with respect to the longitudinal axis of the kayak 20 and have any pattern cell shape. Two other general designs are shown in FIGS. 5*a* and 5*b*.

The important feature is that water is trapped in a closed path provided around each pattern cell 64 by the abrupt edges defining it. At each pattern cell 64, the trapped water flows around each pattern cell 64 in the grooves on the bottom surface of the hull providing a bearing action similar to that of a thrust bearing. This gives the kayak superior performance in a flat spin.

Figure 6:
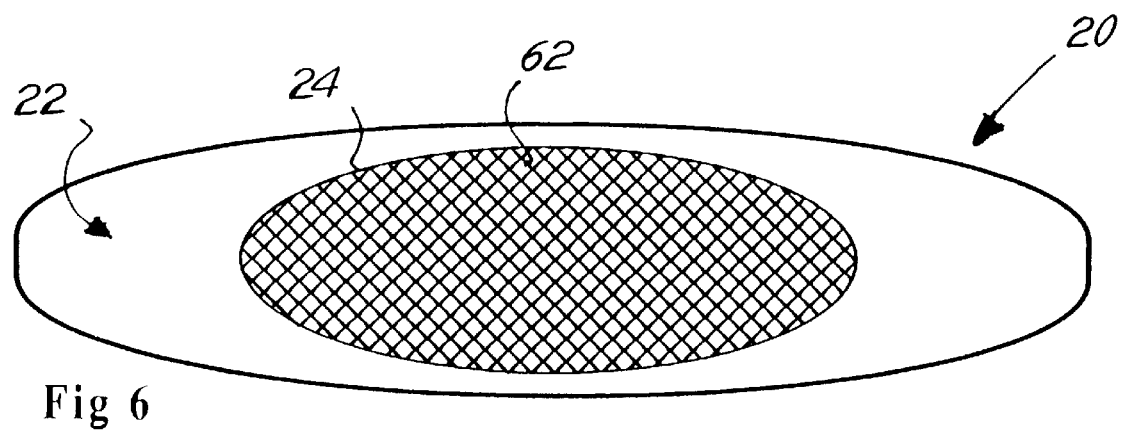
FIG. 6 is a bottom view of a hull of a whitewater kayak with a spin groove and a crossgroove.

FIG. 6 shows yet another embodiment in which a kayak 20 with a hull 22 is provided with a spin groove 24 and a cross groove 62.

Several factors, shown in FIG. 3*f*, must be met in order for the spin groove 24 and cross groove 62 to function effectively: each bevel 54 should have a raise 66 between ⅛ inch and 1 inch and the run 68 of each bevel should be substantially equal to its raise 66.

What is claimed is:

1. A kayak comprising a hull section and a deck section, said hull section having a bottom surface circumscribed by a contour edge, and at least an endess groove formed in said bottom surface and spaced inwardly of said contour edge, whereby said endless groove traps water and provides a thrust bearing action enhancing translational stability during planing conditions and performance in a flat spin a said kayak.

2. A kayak as claimed in claim 1, wherein said endless groove divides said bottom of said hull into a first bottom surface and a second bottom surface circumscribing said first bottom surface.

3. A kayak as claimed in claim 2, wherein said first bottom surface is disposed inferiorly with respect to the second bottom surface.

4. A kayak as claimed in claim 2, wherein said first bottom surface is disposed superiorly with respect to the second bottom surface.

5. A kayak as claimed in claim 2, wherein said first surface is substantially flat.

6. A kayak as claimed in claim 2, wherein said second surface is substantially flat.

7. A kayak as claimed in claim 1, wherein said endless groove has an oblong shape.

8. A kayak as claimed in claim 1, wherein said endless groove has a substantially rectangular shape.

9. A kayak as claimed in claim 1, where in said endless groove has a cusp in a bow section and another cusp in a stern section.

10. A kayak as claimed in claim 1, wherein said endless groove has a cross-sectional profile providing at least one abrupt change in said bottom surface of said hull for the purposes of trapping water.

11. A kayak as claimed in claim 10, wherein said cross-sectional profile provides one convex abrupt change in said bottom surface of said hull.

12. A kayak as claimed in claim 10, wherein said cross-sectional profile provides one concave abrupt change in said bottom surface of said hull.

13. A kayak as claimed in claim 10, wherein said cross-sectional profile provides two convex abrupt changes in said bottom surface of said hull.

14. A kayak as claimed in claim 10, wherein said cross-sectional profile provides one concave abrupt change and another convex abrupt change in said bottom surface of said hull.

15. A kayak as claimed in claim 1, wherein said endless groove is defined by at least a bevel, said bevel having a raise of from about $\frac{1}{8}$ inch to 1 inch.

16. A kayak as claimed in claim 1, wherein said endless grove is defined by at least a bevel, said bevel having a run substantially equal to its raise.

* * * * *